United States Patent [19]

Sharp et al.

[11] Patent Number: 5,348,688
[45] Date of Patent: Sep. 20, 1994

[54] OPTICAL POWER LIMITERS AND MATERIALS THEREIN

[75] Inventors: Edward J. Sharp, Fort Washington, Md.; Gary L. Wood, Lorton, Va.; Richard R. Shurtz, II, Oakton, Va.; Juergen L. W. Pohlmann, Alexandria, Va.

[73] Assignee: The United States of America as represented by the Secretary of the Army, Washington, D.C.

[21] Appl. No.: 700,995

[22] Filed: Dec. 17, 1984

[51] Int. Cl.$^5$ .......................... F21V 9/00; G02F 1/13; C09K 19/06
[52] U.S. Cl. .................. 252/582; 252/299.1; 359/96
[58] Field of Search ............. 350/312, 347 R, 349, 350/350 R, 354; 252/299.1, 582

[56] References Cited

U.S. PATENT DOCUMENTS

| | | | |
|---|---|---|---|
| 3,614,211 | 10/1971 | Letter | 350/312 X |
| 3,623,797 | 11/1971 | Daw | 350/312 X |
| 3,999,144 | 12/1976 | Bret | 350/354 |
| 4,515,429 | 5/1985 | Smith et al. | 350/354 X |

OTHER PUBLICATIONS

Cox, Robert J., Liquid Crystal Guest–Host Systems, Mol. Cryst. LIQ, Crm., 1979, vol. 55, pp. 1–32.

*Primary Examiner*—Shean Wu
*Assistant Examiner*—John S. Maples
*Attorney, Agent, or Firm*—Milton W. Lee; Aubrey J. Dunn; Anthony T. Lane

[57] ABSTRACT

A liquid crystal modified by the addition of an organic dye is used as a non-linear optical material in two devices which limit the optical radiations to sensitive photodetectors. One device uses the self-focusing induced in the crystal to disperse high-intensity optical radiation, the other uses the change of index of refraction of the crystal to effect total reflection of high-intensity radiation from a liquid crystal-linear optical material inter-face 1 Claim, 2 Drawing Sheets

OPTICAL POWER LIMITERS AND MATERIALS THEREIN

The invention described herein may be manufactured, used and licensed by the U.S. Government for governmental purposes without the payment of any royalties thereon.

BACKGROUND OF THE INVENTION

This invention is in the field of protectors of photodetectors from high-intensity optical radiations. In particular, it is concerned with counter-counter measures against counter-measure lasers directed toward image intensifiers or infrared detectors. The usual known counter-counter measures are discussed in previous inventions by two of the present inventors. The instant invention is an improvement on these previous inventions, and is a further improvement over the inventions as set forth in U.S. Pat. application Ser. No. 648,512, filed Aug. 30, 1984 by three of the present inventors, and of U.S. Pat. application Ser. No. 648,140, filed Sep. 5, 1984.

SUMMARY OF THE INVENTION

This invention is two embodiments of an optical power limiter, and unique non-linear optical materials used as an element of the limiters. These materials are liquid crystals with organic dyes added to enhance the non-linearity of the crystals at predetermined wavelengths or wavelength regions.

DESCRIPTION OF PREFERRED EMBODIMENT

The invention may be best understood if this description is taken in conjunction with the drawings. As we disclosed in our previous invention disclosures referred to in the Background Of The Invention, the active materials of the inventions are liquid crystals. The instant invention also used liquid crystals, but with an organic dye added to enhance the non-linear optical properties of the crystals. Typical of the liquid crystals which may be used in the invention are the following:

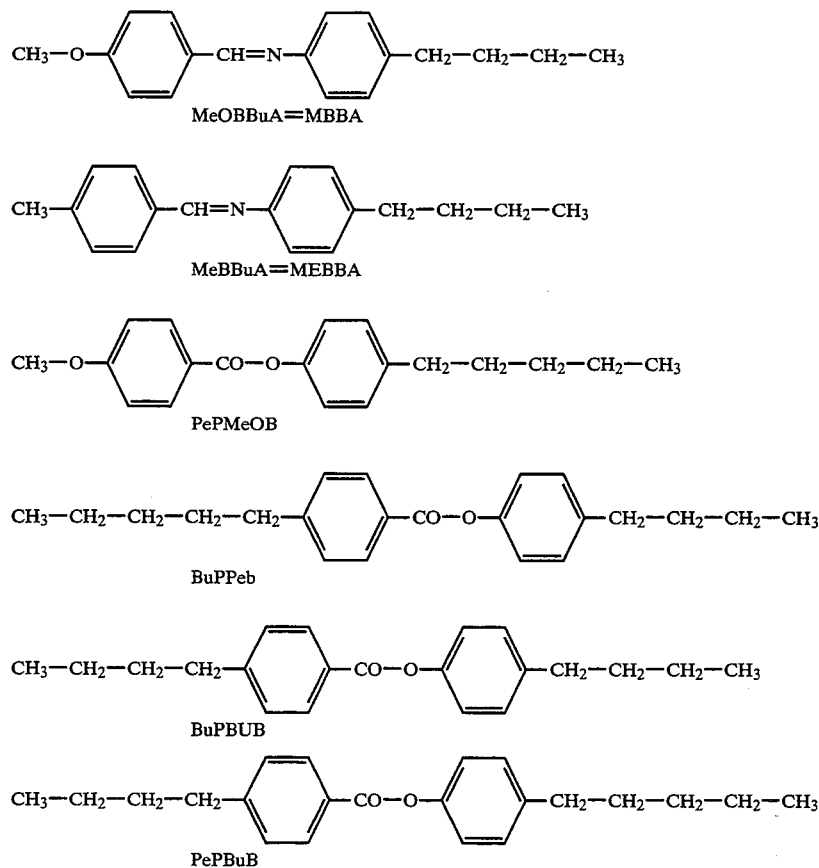

Typical organic dyes which may be used include such soluble dyes as erionyl blacks, GD and R-KWL, all made by CIBA-GEIGY; nigrosine (WSB) and direct black (E-SE), made by Compton & Knowles. The solvents for the dyes include such common solvents as methanol.

Any nonlinear device which depends on the magnitude of the nonlinear index of refraction, $n_2$, can be made more effective by preferrentially altering the magnitude of $n_2$ in specific wavelength regions of interest. Organic dyes are typically strong absorbers in the far UV, visible, or near infrared spectral regions depending on their chemical makeup, This strong absorption serves to distort the electronic configuration of the organic nonlinear medium and can lead to an enhancement of the nonlinearity itself, By adjusting the nonlinear index in this way one can significantly change the properties of the organic medium to fit specific requirements. A specific example of the alterations achieved in a particular organic liquid (MEBBA) can be seen by referring to FIGS. 1 and 2.

Figure 1:
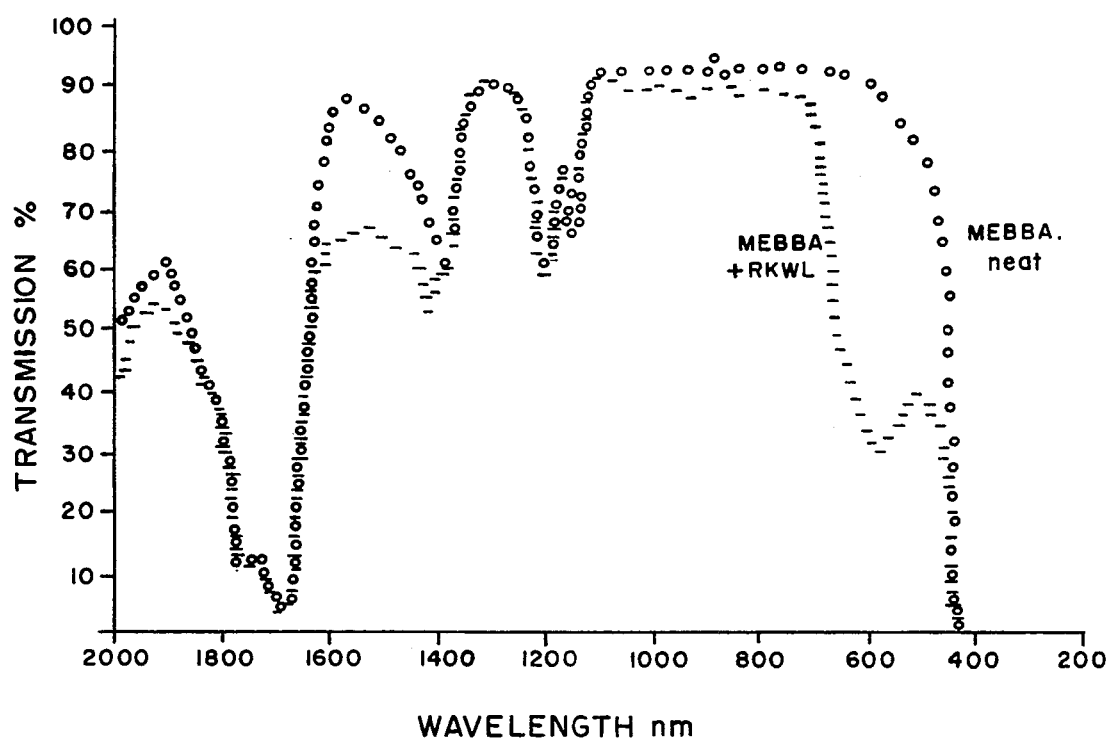
FIG. 1 shows non-linear transmission curves for a neat and modified liquid crystal.

FIG. 1 shows curves of transmission vs radiation wavelength for a particular liquid crystal material, with and without an organic dye added. In particular, the small circle line shows the transmission of neat MEEBA, and the dash line shows the transmission of MEBBA with a solution of RKWL dye added. As can be seen, the dye-added MEBBA has enhanced absorption near 420 nm and in the 1400–1600 nm spectral region. The particular dye solution was 52 mg. of RKWL dye in 100 ml of methanol; 0.1 ml of this solution was added to 1.5 ml of MEBBA. As may be seen, the double ruby frequency at 0.347 $\mu$m is completely absorbed in the ultraviolet band of neat MEBBA. The absorption of double Nd:YAG 1.06 $\mu$m line at 0.532 $\mu$m is enhanced by the dye solution; and increase in the dye concentration would give complete absorption of this line, without significantly affecting the total transmission of the cell. Further, the ultra-violet absorption edge moves spectrally closer to the primary laser line of Nd:YAG at 1.06 $\mu$m (0.65 $\mu$m as opposed to 0.45 $\mu$m of neat MEBBA). This alteration of the ultra-violet response led to an observed factor of five reduction in the critical power for self-focussing of 1.06 $\mu$m, 43 psec pulses in the material; this infers a factor of five increase in the nonlinear index of refraction in exchange for a small fraction of the total transmission.

Figure 2:
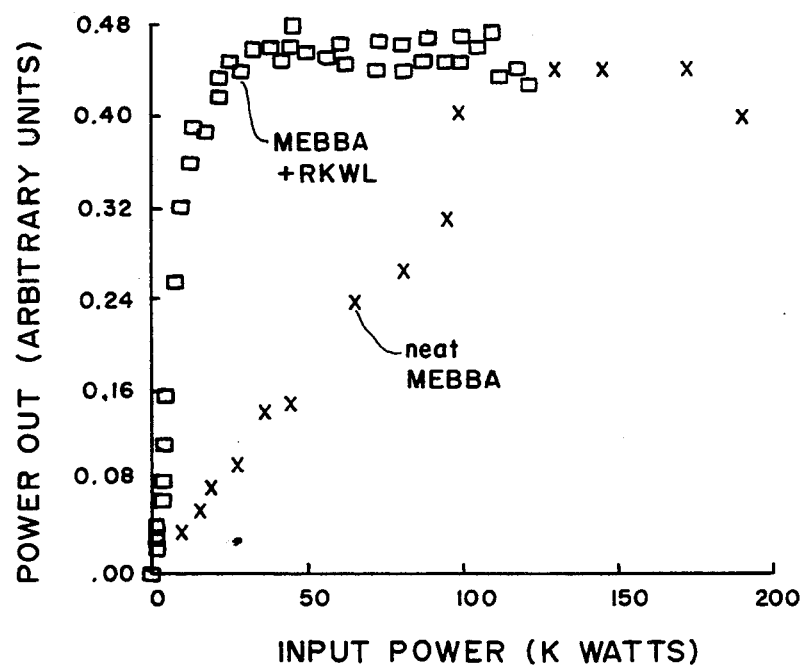
FIG. 2 shows nonlinear transmission curves for another neat and modified liquid crystal.

FIG. 2 shows the output power curves of 1.06 $\mu$m 43 psec pulses vs the input power for neat MEBBA with x's, and RKWL dye-modified MEBBA with small squares. The power-in to power-out ratio ceases to be linear, i.e., becomes nonlinear because of the change in the nonlinear index of refraction, at a critical power of approximately 125 KW for the neat material and about 25 KW for the dye-modified case. The critical power for self-focussing is proportional to the inverse of the nonlinear index of refraction and the factor of 5 reduction in the critical power translates to a factor of 5 increase in the nonlinear index.

Figure 3:
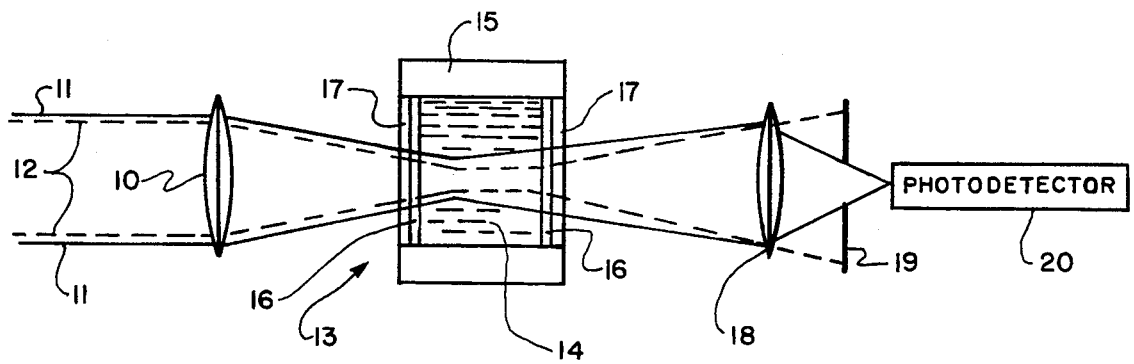
FIG. 3 is a schematic showing of one embodiment of the inventive limiters.
Figure 4:
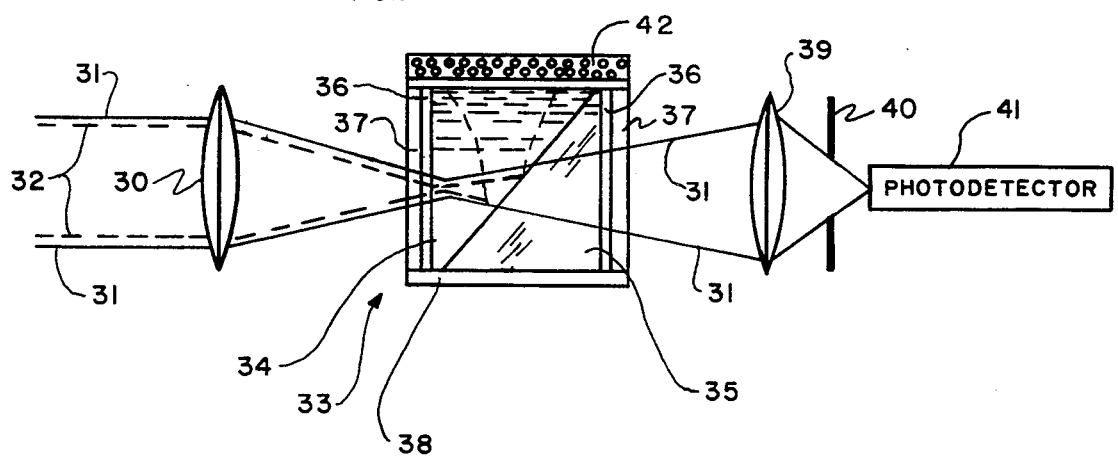
FIG. 4 is a schematic showing of another embodiment of the inventive limiters.

Specific examples of nonlinear optical power limiters that could benefit from dissolved organic dyes are shown in FIGS. 3 and 4. For particular laser threats, the organic medium is selected with dye additives to adequately attenuate the optical frequencies characteristic of the threat.

Referring now to the drawings, FIG. 3 shows an embodiment of the invention including an objective lens 10 which focusses rays 11 and 12 from a distant scene into cell 13. This cell includes a liquid crystal material 14 with organic dye therein. This material is contained by a housing consisting of a hollow of revolution 15 (or other shape) and transparent end walls 16. These walls are covered by an antireflection layer 17. Solid-line rays 11 are for normal-intensity radiation from the scene; these rays pass freely through cell 13 and are directed by lens 18 through aperture plate 19 to photodetector 20. Dotted-line rays 12 are for high-intensity radiation such as laser radiation; these rays do not follow the same paths through 13 as rays 11. Instead, rays 12 are self-focussed in 13 and, after passing through lens 18, are blocked by plate 19. Photodetector 20 is thus protected. Except for the particular material 14 in cell 13, this embodiment of the invention operates substantially the same as the structure shown in Ser. No. 648,512 mentioned above, or as U.S. Pat. No. 4,410,239 of Oct. 18, 1983.

FIG. 4, which shows substantially the same structure and operates in the same manner as NVL 2710 mentioned above, includes objective lens 30 directing rays 31 and 32 into cell 33, This cell includes a dye-modified liquid crystal 34 in contact with a linear optical material 35 whose index of refraction is the same as 34 for normal radiation intensities. Materials 34 and 35 are constrained by transparent windows 36 with antireflection coating 37 thereon, and by transparent body 38, Radiation which passes through 33 is directed by lens 39 through aperture plate 40 to photodetector 41. Normal-intensity rays 31 freely pass through cell 33 and focussed onto photodetector 41, the high-intensity rays induce a nonlinear change in the refractive index of material 34 such that total reflection of rays 32 occurs at the 34–35 interface. These reflected rays are absorbed by absorber 42.

We claim:

1. An optical power limiter for protecting a photodetector from high-power optical radiations, including at least a substantially transparent non-linear optical material whose index of refraction is responsive both to wavelength and to optical power of incident radiation, wherein said material is a nematic liquid crystal with a dye dissolved therein, whereby said dye enhances the index-of-refraction response of said liquid crystal to the wavelengths of said high-power optical radiation; additionally including a linear optical material having a surface in intimate contact at a planar interface with a surface of said nonlinear optical material, and means for directing incident radiation into said nonlinear material toward said photodetector and onto said interface at an angle for total reflection of said high-power optical radiations when the index of refraction of said nonlinear optical material changes in response to said high-power radiation, whereby said high-power optical radiations are self-focussing in said material and totally reflect at said interface to protect said photodetector, and other incident radiation is not self focussing, and is not totally reflected, but freely passes to said photo-detector.

* * * * *